US008369576B2

(12) United States Patent
Watanabe (10) Patent No.: US 8,369,576 B2
(45) Date of Patent: Feb. 5, 2013

(54) IMAGE PROCESSING APPARATUS

(75) Inventor: Ikuo Watanabe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 205 days.

(21) Appl. No.: 12/684,453

(22) Filed: Jan. 8, 2010

(65) Prior Publication Data

US 2010/0111368 A1 May 6, 2010

Related U.S. Application Data

(63) Continuation of application No. PCT/JP2009/065878, filed on Sep. 4, 2009.

(30) Foreign Application Priority Data

Sep. 4, 2008 (JP) ................................ 2008-226976

(51) Int. Cl.
*G06K 9/00* (2006.01)
(52) U.S. Cl. .......................... 382/106; 382/199; 382/232
(58) Field of Classification Search .................. 382/106, 382/298, 299, 255; 348/572
See application file for complete search history.

(56) References Cited

U.S. PATENT DOCUMENTS

| 5,353,063 A | | 10/1994 | Yagisawa et al. | |
|---|---|---|---|---|
| 5,485,213 A | * | 1/1996 | Murashita et al. | 375/240.12 |
| 5,502,570 A | | 3/1996 | Shikakura et al. | |
| 5,544,176 A | | 8/1996 | Fujii et al. | |
| 5,926,609 A | | 7/1999 | Shikakura et al. | |
| 6,031,941 A | * | 2/2000 | Yano et al. | 382/276 |
| 6,933,722 B2 | * | 8/2005 | Tsuda et al. | 324/318 |
| 2004/0066970 A1 | * | 4/2004 | Matsugu | 382/217 |
| 2004/0120606 A1 | * | 6/2004 | Fredlund | 382/305 |
| 2006/0055776 A1 | * | 3/2006 | Nobori et al. | 348/142 |
| 2007/0121095 A1 | * | 5/2007 | Lewis | 356/5.01 |
| 2007/0160310 A1 | * | 7/2007 | Tanida et al. | 382/276 |
| 2008/0118171 A1 | * | 5/2008 | Iwabuchi | 382/255 |
| 2008/0247638 A1 | * | 10/2008 | Tanida et al. | 382/154 |
| 2010/0046818 A1 | * | 2/2010 | Yamaya et al. | 382/131 |

FOREIGN PATENT DOCUMENTS

CN 101276460 A 10/2008

(Continued)

OTHER PUBLICATIONS

Michael Irani and Shmuel Peleg, "Improving Resolution by Image Registration," Graphical Models and Image Processing, vol. 53, No. 3, pp. 231-239, May 1991.

(Continued)

*Primary Examiner* — Chan S. Park
*Assistant Examiner* — Nancy Bitar
(74) *Attorney, Agent, or Firm* — Fitzpatrick, Cella, Harper & Scinto (57) ABSTRACT

An image processing apparatus in which an erroneous discrimination about a convergence of a super resolution process can be eliminated and precision of the super resolution process can be improved is provided. The apparatus has: a distance measuring unit that measures a distance to an object; a deteriorated image reconstructing unit that reconstructs an image of the object by repetitive calculations; and an end discriminating unit that discriminates an end of an image reconstructing process. In the case of discriminating an end of the image reconstructing process, the end discrimination is made only to a specific distance layer based on information of the distance measured by the distance measuring unit or every distance layer based on the distance information.

15 Claims, 9 Drawing Sheets

FOREIGN PATENT DOCUMENTS

| | | | |
|---|---|---|---|
| EP | 1 699 233 A1 | | 9/2006 |
| JP | 5-205048 | | 8/1993 |
| JP | 11-257951 | | 9/1999 |
| JP | 11257951 | * | 9/1999 |
| JP | 2005-167484 | | 6/2005 |
| JP | 2006-119843 | | 5/2006 |
| JP | 2006-195856 | | 7/2006 |
| JP | 2006-242746 | | 9/2006 |
| JP | 2007-193508 | | 8/2007 |

OTHER PUBLICATIONS

PCT International Search Report and Written Opinion of International Search Authority in PCT/JP2009/065878 issued Oct. 28, 2009.

Mar. 17, 2011 International Preliminary Report on Patentability (with Apr. 21, 2011 English translation) in International Patent Application No. PCT/JP2009/065878.

Nov. 21, 2012 Chinese Official Action in Chinese Patent Appln. No. 200980134755.8.

* cited by examiner

Far

Mid

Near

IMAGE PROCESSING APPARATUS

CROSS-REFERENCE TO RELATED APPLICATIONS

This application is a continuation of International Application No. PCT/JP2009/065878, filed Sep. 4, 2009, which claims the benefit of Japanese Patent Application No. 2008-226976, filed Sep. 4, 2008.

BACKGROUND OF THE INVENTION

1. Field of the Invention

The invention relates to an image processing apparatus for reconstructing a deteriorated image.

2. Description of the Related Art

Hitherto, in the case where an object was photographed by an image pickup apparatus such as a digital camera, there is a situation where when the image is seen later, it becomes a deteriorated image due to an out-of-focus or the like. In such a case, a trial to reconstruct the deteriorated image by a super resolution process is made and various kinds of algorithms for the super resolution are considered. For example, Irani and Peleg propose a typical method (hereafter "Irani-Peleg method") for reconstruction from a plurality of blur images in Improving Resolution by Image Registration CVGIP: GRAPHICAL MODELS AND IMAGE PROCESSING Vol. 53, No. 3, pp. 231-239, May 1991.

The following equation (1) is used in an image reconstructing process of the Irani-Peleg method. According to such a system, an unknown original image is gradually presumed from the deteriorated image in a repetitive process. At this time, a norm (differential square sum of each pixel) of a pseudo blur image $g^{(n)}$ formed by convolving a point spread function ($h^{PSF}$) showing a presumed blur to a just-previous reconstruction image $f^{(n)}$ shown in the equation (1) and a blur image g obtained by photographing is calculated and it is assumed to be $f^{(n+1)}$. That is, $e^{(n)}$ in the following equation (2) is calculated and a case where it is minimum is regarded as completion of the image reconstruction.

$$f^{(n+1)} = f^{(n)} + (g - g^{(n)}) \times h^{AUX} / c$$
$$= f^{(n)} + (g - f^{(n)} \times h^{PSF}) \times h^{AUX} / c$$

Equation (1)

where,
c: normalization constant
ω: spatial frequency
$h^{AUX}$ may be a function which satisfies $$0 < |1 - H^{PSF}(\omega) \cdot H^{AUX}(\omega)/c| < 1$$

with respect to all ω and $H^{PSF}$ is generally used.
H: Fourier transformation of h $$e^{(n)} = \|g^{(n)} - g^{(0)}\|$$

Equation (2)

where, $\| \|$: norm showing the differential square sum or differential absolute value sum of each pixel.

An algorithm obtained by improving a typical Richardson-Lucy method using a Bayes presumption for a presumption of an original image has been disclosed in Japanese Patent Application Laid-Open No. 2006-242746. Fifteen kinds of non-patent documents regarding the super resolution process have been disclosed in Japanese Patent Application Laid-Open No. 2006-195856.

A technique for measuring a distance to an object to be photographed and obtaining distance information of each pixel is also known. For example, a method called a stereo method of improving distance measuring precision at a far distance by combining a telescope to a technique for measuring a distance to an object to be photographed has been disclosed in Japanese Patent Application Laid-Open No. H11-257951.

SUMMARY OF THE INVENTION

Figure 9:
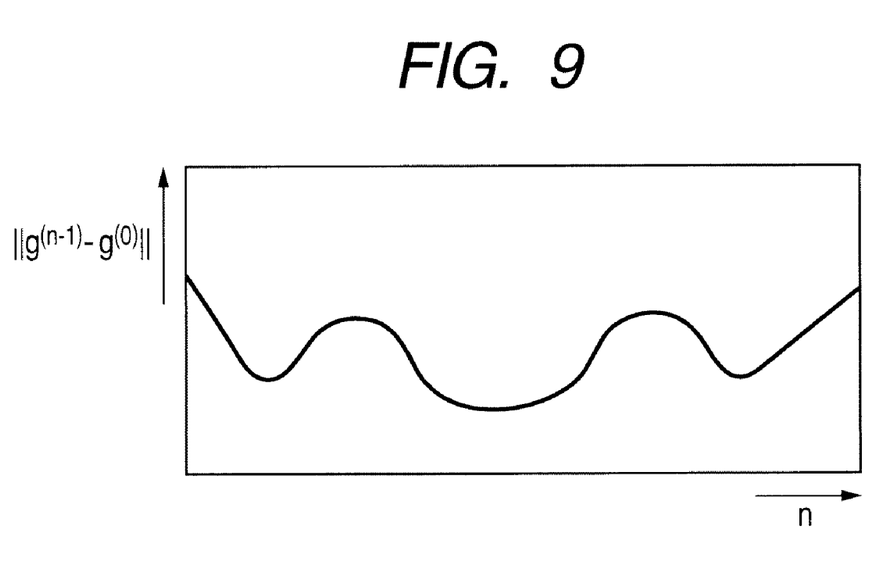
FIG. 9 is a diagram illustrating a norm of a whole display screen.

In the case of executing the deteriorated image reconstructing process, generally, the numbers of optimum deterioration reconstructing times of a plurality of objects in an image differ in a process of a repetitive reconstructing unit due to a difference of a degree of out-of-focus of each object. That is, as illustrated in FIG. 9, there is such a problem that an evaluating function for discriminating a convergence, for example, the norm of a convolution of the image before/after the process or the reconstruction image and the point spread function ($h^{PSF}$) showing the blur and the blur image has a plurality of minimum values and which one of the minimum values is a correct answer is not known.

To solve such a problem, a technique in which the optimum deterioration reconstructing discrimination is performed for every pixel and the process of the reconstruction completion pixel is frozen, thereby reconstructing all of the pixels has been disclosed in Japanese Patent Application Laid-Open No. H05-205048. According to such a method, a filtering for obtaining a difference between the adjacent pixels is executed to a neighborhood region of each pixel of the reconstruction image, thereby presuming noises (=ringing due to a high frequency emphasizing filter) in the neighborhood region and obtaining a dispersion of the presumed noises. With respect to the pixel in which a difference between a dispersion of the pixel values and the dispersion of the noises is smaller than a predetermined value, it is decided that the pixel has been converged. However, the above system is a method based only on the presumption and there is a possibility of a mixture of an error in a portion where the ringing noises and the real image exist mixedly.

It is an object of the invention to provide an image processing apparatus in which an erroneous discrimination about a convergence of a super resolution process can be eliminated and precision of the super resolution process can be improved.

According to the invention, there is provided an image processing apparatus for reconstructing a deteriorated image, comprising: a unit that measures a distance to an object; an image reconstructing unit that reconstructs an image of the object by repetitive calculations; and an end discriminating unit that discriminates an end of the image reconstructing process, wherein the end discriminating unit makes the end discrimination only to a specific distance layer based on information of the distance measured by the measuring unit or every distance layer based on the distance information.

Further features of the present invention will become apparent from the following description of exemplary embodiments with reference to the attached drawings.

DESCRIPTION OF THE EMBODIMENTS

Subsequently, a best mode for carrying out the invention will be described in detail with reference to the drawings.

First Embodiment

Figure 1:
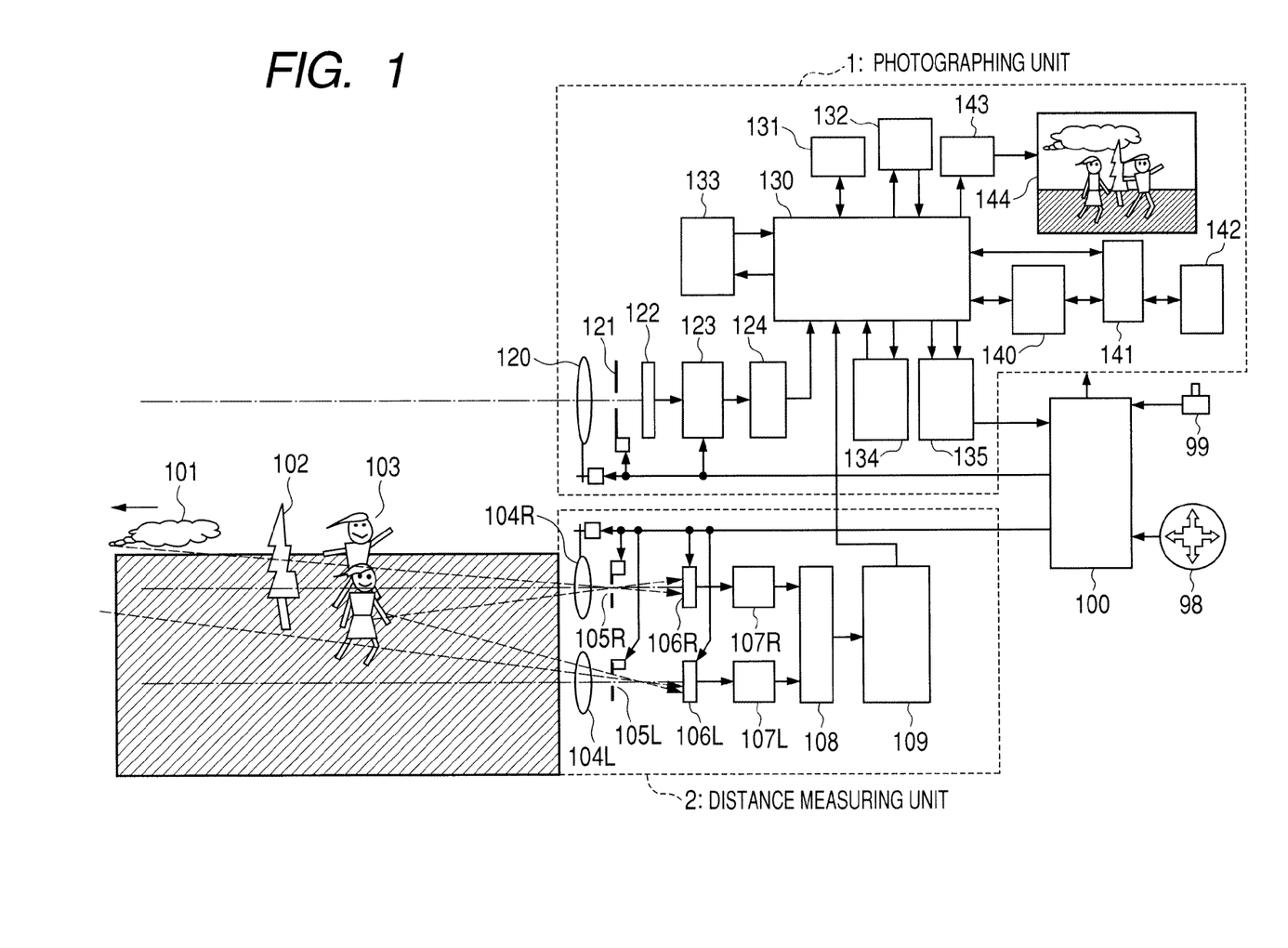
FIG. 1 is a block diagram illustrating the first embodiment of an image processing apparatus according to the invention.

FIG. 1 is a block diagram illustrating a construction of the first embodiment of an image processing apparatus according to the invention. Particularly, the first embodiment shows an example in which a resolution reconstructing process of an object which belongs to a specific distance layer is executed.

In the diagram, reference numeral 1 denotes a photographing unit and 2 indicates a distance measuring unit. An example in which a twin-lens stereo method is used in the distance measuring unit 2 is illustrated. An image pickup lens 120, an aperture 121, and an image pickup device 122 such as a CCD are arranged in the photographing unit 1. Reference numeral 123 denotes an ADC (A/D converter) for A/D converting an image pickup signal from the image pickup device 122; 124, a camera processing unit for executing a filtering process or the like; 130, a memory controller; and 131, a memory such as an SDRAM or the like.

Reference numeral 132 denotes an image reducing unit; 133, a PSF table; 134, a deteriorated image reconstructing unit; 135, an image process effect discriminating unit; 140, a codec; 141, a flash memory controller; and 142, a flash memory. Further, reference numeral 143 denotes a display interface; 144, a display unit such as a liquid crystal; 98, a cross-pad; 99, a shutter; and 10, a system controller for controlling the whole system.

Image pickup lenses 104R and 104L are arranged in the distance measuring unit 2. Apertures 105R and 105L, image pickup devices (CCDs or the like) 106R and 106L, and ADCs (A/D converters) 107R and 107L are also arranged in correspondence to the image pickup lenses, respectively. Reference numeral 108 denotes a distance discriminating unit for discriminating the distance to the object and 109 indicates a distance image forming unit. Each of the ADC 123 and the ADCs 107R and 107L has an AGC function.

An example of objects is illustrated in a left lower portion in FIG. 1 (each object is illustrated by an overhead view). Three objects are illustrated in FIG. 1. Reference numeral 101 denotes a far view object (actually, existing at a far left position shown by an arrow); 102, a middle distance object; and 103, a near view object.

Figure 2:
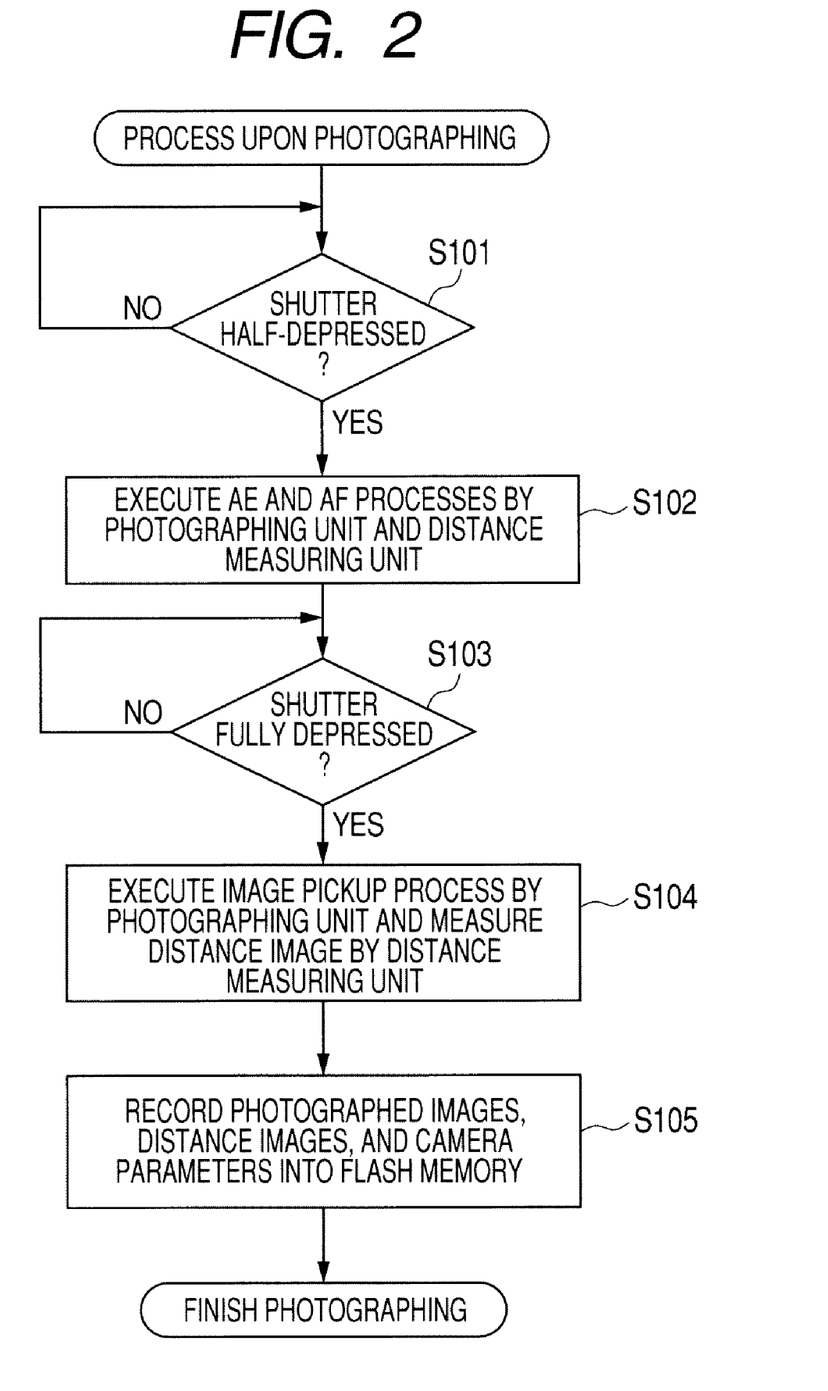
FIG. 2 is a flowchart for describing a photographing process in the first embodiment of the invention.
Figure 3:
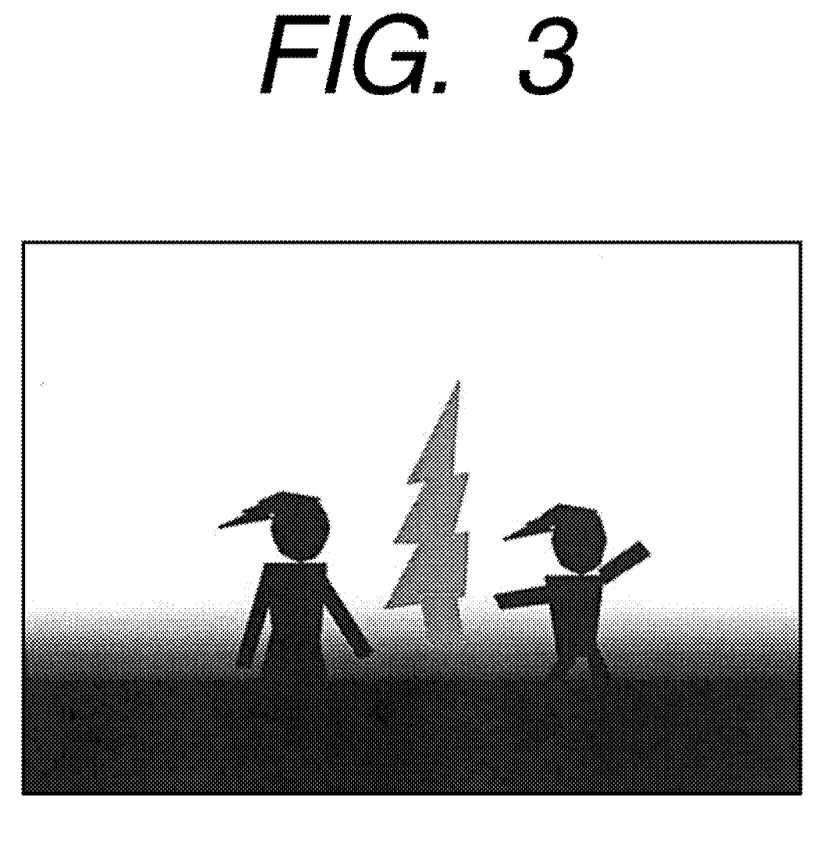
FIG. 3 is a diagram illustrating an example of a distance image.

Subsequently, the photographing processing operation in the embodiment will be described by using FIGS. 1, 2, and 3. FIG. 2 is a flowchart illustrating the photographing process in the embodiment. FIG. 3 illustrates an example of a distance image obtained by the distance image forming unit 109.

1. At the Time of Preparing for Photographing.

First, when the shutter 99 is half-depressed (S101 in FIG. 2), the system controller 100 executes an AE (automatic exposure) process and an AF (automatic focus) process of the photographing unit 1 and the distance measuring unit 2 in order to prepare for photographing (S102). Generally, in the AE process, the aperture 121, the apertures 105L and 105R, the ADCs 107L and 107R, and the AGC in the ADC 123 are controlled in such a manner that a brightness of a center portion where the important object is located is equal to a predetermined value instead of an over-exposure or an under-exposure.

In the AF process, on the other hand, in a manner similar to the case of AE, the image pickup lenses 104R and 104L and the image pickup lens 120 are adjusted by a mountain climbing method in such a manner that an amount of high frequency components of an ADC output of the center portion increases. The distance measuring unit 2 uses the twin-lens stereo method as mentioned above. Generally, in the distance measuring unit 2, since a lens of a small diameter and a monochromatic CCD of a small diameter are used for the photographing unit 1, a depth of large is deep and a sensitivity is high.

2. At the Time of Photographing.

Subsequently, when the shutter 99 is fully depressed (S103), the image pickup process is executed in the photographing unit 1 and the distance image is measured in the distance measuring unit 2 (S104). At this time, an output of the ADC 123 is converted from a Bayer array image into an RGB image by a filtering process in the camera processing unit 124 and is written into the memory 131 through the memory controller 130 (S105).

In the distance measuring unit 2, an output of each pixel of the ADCs 107R and 107L is input to the distance discriminating unit 108. In this instance, a plurality of pixels on the right and left sides of each pixel are shifted to the right and left and one norm (differential absolute value sum) is calculated. A distance of a layer to which the pixel belongs is calculated from a shift amount at the time when the minimum value is obtained. In the distance image forming unit 109, by calculating such a distance for every pixel, a distance image as shown in FIG. 3 is formed and is written into the memory 131 through the memory controller 130 in a manner similar to the photograph image (S105). The distance information is recorded as a distance image expressed by bitmap information of about 8 bits.

In the distance image illustrated in FIG. 3, the near view is shown in black, the middle distance is shown in gray (expressed by a middle color between black and white), and a far view is shown in white. In the embodiment, it is assumed that the distance information showing boundaries among a near view layer, a middle distance layer, and a far view layer has previously been set (the near view layer: 0-5 m, the middle distance layer: 5-20 m, the far view layer: 20 m-). The information showing the boundaries may be decided based on a histogram of the distance information. For example, by setting the distance of a small frequency to the boundary of the layers, an unevenness that is caused by a difference of the image reconstructing process of each layer can be minimized. The number of distance layers is not limited to the three layers of the near view layer, the middle distance layer, and the far view layer. The number of layers may be equal to a natural number N (N≧2). Since the depth of field differs depending on a size of pupil (aperture), it is necessary to adjust the number of layers according to the depth of field. For example, when the aperture is opened in a lens of a large diameter, since a depth of field is shallow, the larger number of layers are necessary. As for a division interval, it is desirable to finely divide a near view in such a manner that a reciprocal number of the distance becomes almost constant. As illustrated in the left lower portion in FIG. 1, although the positions of the near view object 103 which is photographed by the image pickup devices 106L and 106R are deviated to the outside, the substantially infinite far view object 101 whose light beam will become an almost parallel light beam is photographed at the same position of both of the image pickup devices. This point has been disclosed in detail in Japanese Patent Application Laid-Open No. H11-257951.

After the photographing, in addition to the photograph images and the distance images written in the memory 131, photograph parameters (information such as focus, zoom, and aperture, and the like) are read out through the memory controller 130. The photograph images are written into the flash memory 142 through the codec 140 and the flash memory controller 141 as necessary.

3. Confirmation of Image after Photographing.

After the photographing, when the operator instructs by operating the cross-pad 98, the photographed images are read out of the flash memory 142 through the flash memory controller 141 by the system controller 100 and are written into the memory 131 through the memory controller 130.

The read-out image of a few megapixels is, first, reduced by the image reducing unit 132 and displayed by the small display unit 144 of about VGA. When the image of the object is carefully confirmed while decreasing a reduction degree, there is a case where the AF position has been in-focused to the middle distance object 102 of a background instead of the desired object (near view object) 103.

Particularly, in the case of the constructional diagram as illustrated in FIG. 1, according to the spot distance measuring system, the focal point is focused to the center and what is called a center-skip rear focus phenomenon is liable to occur. However, since such a state is not a large blur state where the infinite far view object 101 has been in-focused, there are many cases where even if the image is simply seen by a small monitor display screen just after the photographing, the rear focus state cannot be confirmed.

4. Image Reconstruction.

Figure 4:
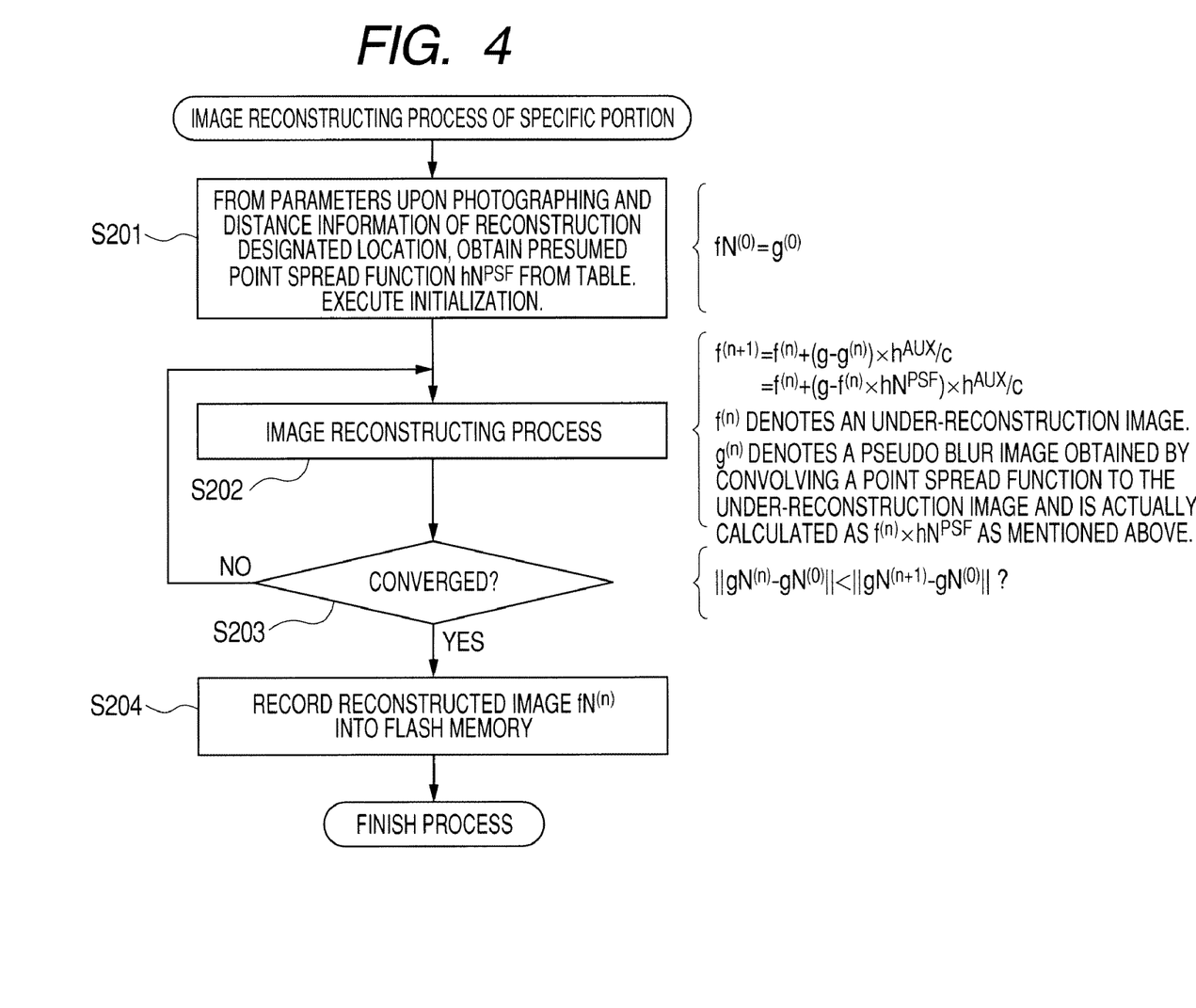
FIG. 4 is a flowchart for describing an image process in the first embodiment of the invention.
Figure 5:
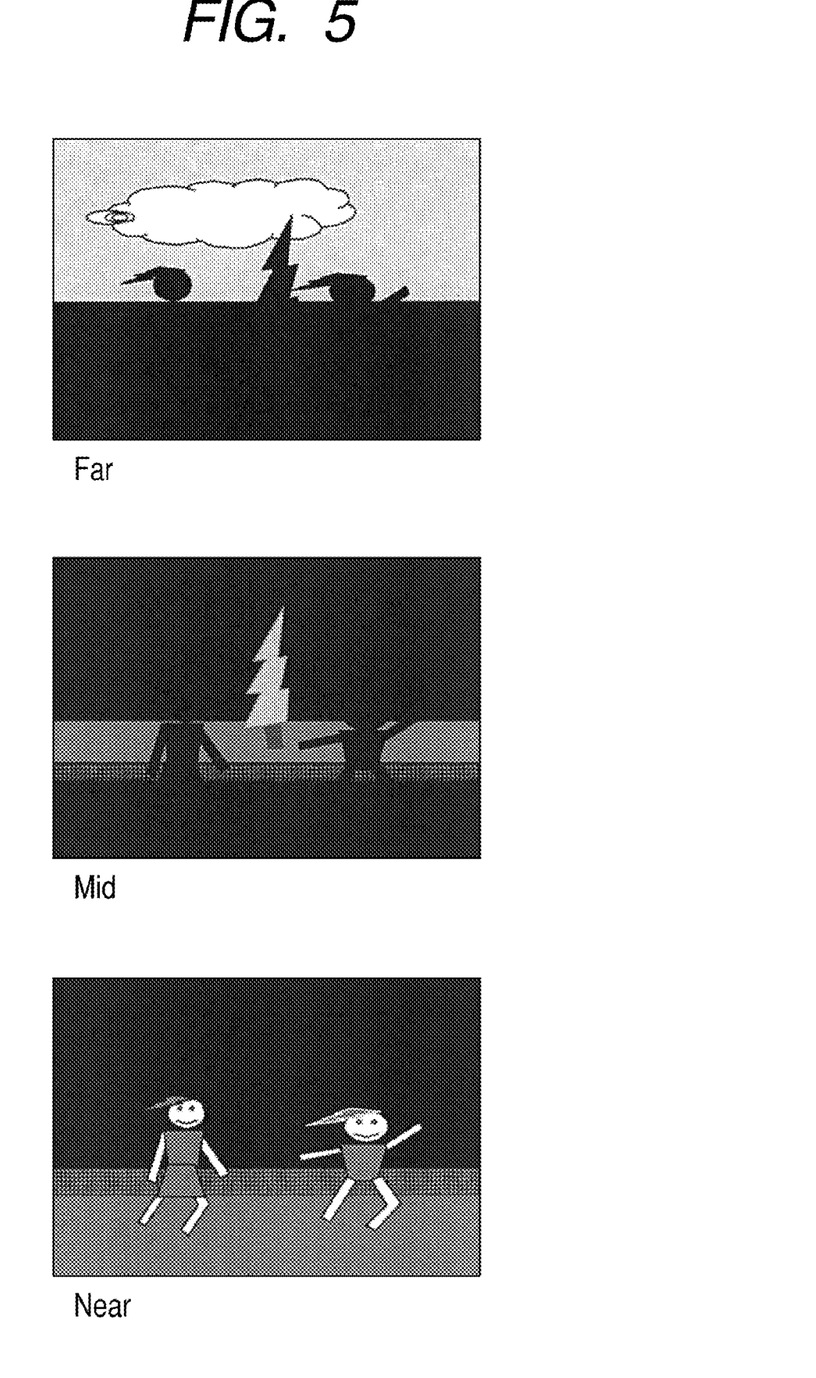
FIG. 5 is a diagram illustrating examples of partial images in which a photograph image has been separated based on distance information.

FIG. 4 is a flowchart illustrating an image reconstructing process in the embodiment. FIG. 5 illustrates examples of partial images in which a photograph image has been separated based on the distance information. The operation at the time of the image reconstruction in the embodiment will now be described by using FIGS. 1, 4, and 5.

4.1 Image Reconstruction Pre-Process.

Therefore, the image reconstructing process is executed. At this time, the image reconstructing process is executed by performing the repetitive calculations to the deteriorated image. First, the operator operates the cross-pad 98 and instructs which image should be reconstructed, so that the system controller 100 starts the reconstructing process of the image displayed at present. In this example, a case where one of the near view human objects has been instructed is presumed. From the distance image in which the instructed pixel exists, the system controller 100 determines that the region where the reconstruction is performed is a near view. It is assumed that the pixel of a deteriorated image $gN^{(n)}$ is used for a convergence discrimination.

$gN^{(n)}$ denotes a set of pixels of a portion corresponding to the near view (Near) in the distance image shown in black in FIG. 3 in the deteriorated image $g^{(n)}$ and is an image of Near illustrated in FIG. 5. The photograph parameters and a deteriorated image (assumed to be $g^{(0)}$) in the memory 131 are sent to the deteriorated image reconstructing unit 134 through the memory controller 130. A repetitive processing counter n for counting the number of image reconstruction processing times is set to 0 (initialization).

In order to set an initial image $f^{(0)}$ of the deteriorated image process to $g^{(0)}$, $g^{(0)}$ is copied in the memory. A point spread function $hN^{PSF}$ of $gN^{(n)}$ at the time of photographing is obtained from the photograph parameters and the PSF table 133 (S201 in FIG. 4).

4.2 Image Reconstruction Repeating Process.

Subsequently, the deteriorated image reconstructing unit 134 executes the image reconstructing process of one step (S202), again writes a reconstruction image into another area in the memory 130 through the memory controller 130, and sets it as a new under-reconstruction image $f^{(n+1)}$. A case where the Irani-Peleg method is used in the image reconstructing process will be described as an example and the equation (1) described in the Background Art is used.

A calculating equation in this case is shown in FIG. 4. $hN^{PSF}$ denotes the point spread function. The normalization constant c and $h^{AUX}$ are as described in the Background Art.

4.3 Convergence Discrimination.

Subsequently, the system controller 100 makes a convergence discrimination (end discrimination) (S203). Specifically speaking, $\|gN^{(n)} - gN^{(0)}\|$ is calculated and held. gN denotes a norm of the pseudo blur image $gN^{(n)}$ formed by convolving an image $fN^{(n)}$ obtained after the image reconstructing process of the pixel in the region which has been determined to be a near view Near of a black portion in FIG. 3 and the point spread function $hN^{PSF}$ and a blur image $gN^{(0)}$ obtained at the time of photographing.

$\|gN^{(n)} - gN^{(0)}\|$ is compared with $\|gN^{(n+1)} - gN^{(0)}\|$. If a value obtained by processing later is larger than a value of the former process, the convergence is determined (end discrimination) by regarding as an excessive process and an optimum reconstruction processing image f is set to $f^{(n)}$ at this point in time. If the convergence is not performed yet, the system controller 100 substitutes $f^{(n)} = f^{(n+1)}$. The processing routine is returned to S202 (process of 4.2), the image reconstructing process is executed, and the end discrimination is made in S203.

If it is decided that the convergence has been performed, the system controller 100 reads out the optimum reconstruction image f from the memory 131 through the memory controller 130 and writes it into the flash memory 142 through the flash memory controller 141 (S204). In this manner, the image reconstructing process is finished. It is sufficient that the operator decides any one of the following modes by instructing it by using the cross-pad 98, or the like: a mode in which the image is compressed again by the codec 140; a mode in which the whole previous blur image is overwritten and erased; and a mode in which only the near view (Near) portion of the blur image is replaced by the optimum reconstruction image f.

In the embodiment, only the pixel of the designated distance layer is used for a convergence discriminating function at the time of executing the super resolution process. That is, the distance layer is formed from the distance information and the end discrimination of the super resolution process is made only with respect to the specific distance layer. Therefore, the number of minimum values of the convergence evaluation is equal to 1. Consequently, since a plurality of minimum values showing the discrimination result are not generated, the erroneous discrimination is never made and the precise image reconstructing process can be executed. Although the case of the monochromatic image has been described in the embodiment, in the case of a color image, generally, RGB signals are converted into YUV signals showing a luminance and color differences, the convergence discrimination is made with respect to only Y, and the image processes are equivalently executed to all of YUV. It is desirable to execute a sub-sampling process of the UV signals and execute a JPEG compression after completion of the image reconstruction.

Second Embodiment

Figure 6:
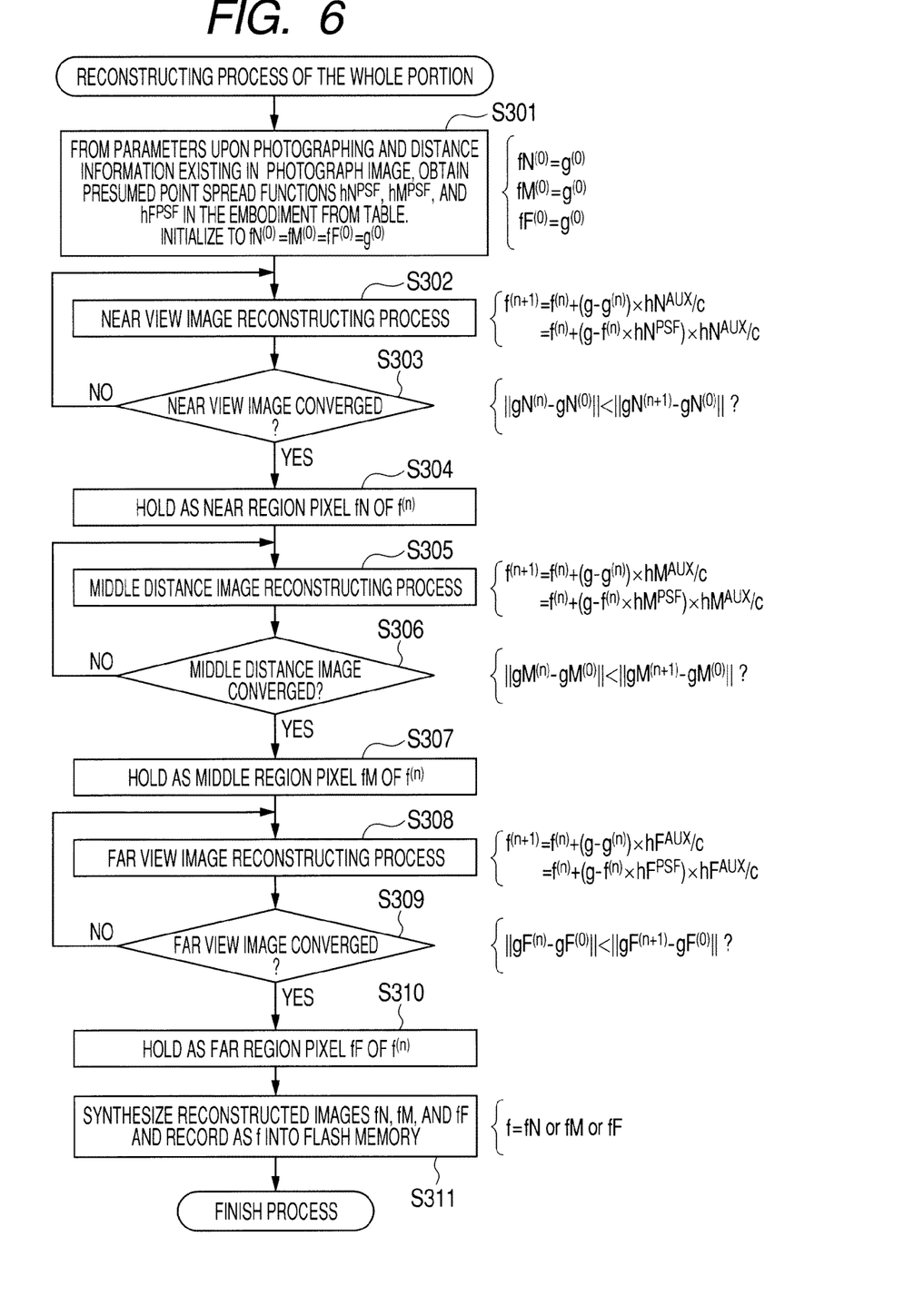
FIG. 6 is a flowchart for describing an image process in the second embodiment of the invention.

Subsequently, the second embodiment of the invention will be described by using FIGS. 1, 3, and 6. FIG. 6 is a flowchart illustrating the image reconstructing process in the embodiment. The embodiment relates to an example in which the resolution reconstructing processes of the objects belonging to all of the distance layers, in this case, the three distance layers of the near view (N), the middle distance (M), and the far view (F) are executed. The image reconstructing process in each of the distance layers is fundamentally similar to that in the first embodiment. A construction of the embodiment is similar to that in FIG. 1. Since 1. the operation at the time of preparing for photographing, 2. the operation at the time of photographing, and 3. the operation to confirm the image after photographing are similar to those in the first embodiment, their description is omitted here.

4. Image Reconstruction.

4.1 Image Reconstruction Pre-Process.

When the operator operates the cross-pad 98 and instructs that he wants to reconstruct all of the distance images, the system controller 100 starts the reconstructing process of the image displayed at present. From the distance images, the system controller 100 determines that the region where the reconstruction is executed can be separated into the three layers of the near view (N), the middle distance (M), and the far view (F). It is assumed that the pixels of each of deteriorated images gN, gM, and gF are used in the convergence discrimination.

From the parameters upon photographing and the distance information existing in the photograph images, the system controller 100 obtains presumed point spread functions, in the embodiment, $hN^{PSF}$, $hM^{PSF}$, and $hF^{PSF}$ from the PSF table 133 (S301).

Further, in order to set the initial images of the under-reconstruction images into $(fN^{(0)}=fM^{(0)}=fF^{(0)}=g^{(0)}$, the repetitive processing counter n for counting the number of image reconstruction processing times is set to 0 (initialization) (S301).

4.2 Image Reconstruction Repeating Process.

Subsequently, the system controller 100 sends the under-reconstruction images ($fN^{(n)}$, $fM^{(n)}$, and $fF^{(n)}$) in the memory 131 to the deteriorated image reconstructing unit 134 through the memory controller 130 and executes the image reconstructing process of one step. The system controller 100 again writes the under-reconstruction images into another area in the memory 131 through the memory controller 130 and sets them as new under-reconstruction images ($fN^{(n+1)}$, $fM^{(n+1)}$, $fF^{(n+1)}$). The foregoing equation (1) is used in the image reconstructing processes of the near view image, the middle distance image, and the far view image in a manner similar to the first embodiment.

In FIG. 6, the near view image reconstructing process is executed in S302 with respect to the near view image, the middle distance image reconstructing process is executed in S305 with respect to the middle distance image, and the far view image reconstructing process is executed in S308 with respect to the far view image. As mentioned above, the equation (1) is used in the image reconstructing processes of the near view image in S302, the middle distance image in S305, and the far view image in S308.

Calculating equations of the image reconstructing processes are shown in FIG. 6, respectively. $hN^{PSF}$, $hM^{PSF}$, and $hF^{PSF}$ indicate the point spread functions as mentioned above.

4.3 Convergence Discrimination.

In FIG. 6, the near view image convergence discrimination (end discrimination) is made in S303, the middle distance image end discrimination is made in S306, and the far view image end discrimination is made in S309, respectively. The convergence discriminating processes in S303, S306, and S309 will now be described in detail. The system controller 100 calculates $\|gN^{(n+1)}-gN^{(0)}\|$, $\|gM^{(n+1)}-gM^{(0)}\|$, and $\|gF^{(n+1)}-gF^{(0)}\|$ and holds them, respectively.

$\|gN^{(n+1)}-gN^{(0)}\|$ will be described. That is, it is a norm which is calculated from: the pseudo blur image $gN^{(n+1)}$ formed by convolving the image obtained after the image reconstructing process of the layer which has been determined as a near view Near in FIG. 3 and the blur function $hN^{PSF}$ of the relevant distance; and the region $gN^{(0)}$ of the blur image $g^{(0)}$ obtained upon photographing.

$\|gM^{(n+1)}-gM^{(0)}\|$ will be described. That is, it is a norm which is calculated from: the pseudo blur image $gM^{(n+1)}$ formed by convolving the image obtained after the image reconstructing process of the layer which has been determined as a middle distance Middle in FIG. 3 and the blur function $hM^{PSF}$ of the relevant distance; and the region $gM^{(0)}$ of the blur image $g^{(0)}$ obtained upon photographing.

$\|gF^{(n+1)}-gF^{(0)}\|$ will be described. That is, it is a norm which is calculated from: the pseudo blur image $gF^{(n+1)}$ formed by convolving the image obtained after the image reconstructing process of the layer which has been determined as a far view Far in FIG. 3 and the blur function $hF^{PSF}$ of the relevant distance; and the region $gF^{(0)}$ of the blur image $g^{(0)}$ obtained upon photographing.

Subsequently, $\|gN^{(n)}-g^{(0)}\|$ is compared with $\|gN^{(n+1)}-g^{(0)}\|$ with respect to the near view image. If a value obtained by processing later is larger than a value of the former process, the convergence is determined by regarding as an excessive process (S303) and the optimum reconstruction processing image is held as $fN^{(n)}$ by adding n at this point in time (S304). Similarly, also with respect to the distance portions of the other middle distance image and the far view image, calculations are performed and $fM^{(n)}$ and $fF^{(n)}$ at the point of time when the process is determined to be an excessive process in S306 or S309 are held (S307, S310).

If it is determined that the convergence is not finished yet in each distance portion, in the case of the distance in which the convergence is not completed, for example, in the case of the near view image, the system controller 100 substitutes $fN^{(n)}=fN^{(n+1)}$ and returns to S302 (image reconstructing process of 4.2). Similarly, the near view image reconstructing process is executed and the convergence discrimination is made in S303.

In the case of the middle distance image, $fM^{(n)}=fM^{(n+1)}$ is substituted, the processing routine is returned to S305, similarly, the middle distance image reconstructing process is executed, and the convergence discrimination is made in S306. Further, in the case of the far view image, $fF^{(n)}=fF^{(n+1)}$ substituted, the processing routine is returned to S308, similarly, the far view image reconstructing process is executed, and the convergence discrimination is made in S309.

Figure 7A:
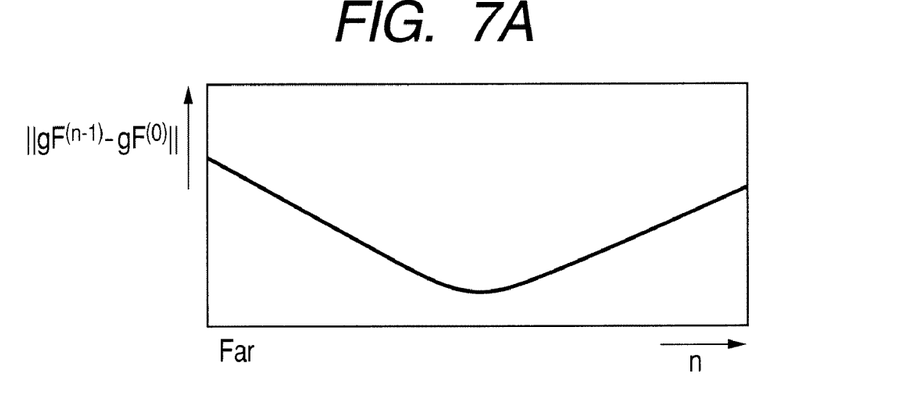
FIGS. 7A, 7B, and 7C are diagrams each illustrating a norm at the time of reconstructing an image of every distance information.
Figure 7B:
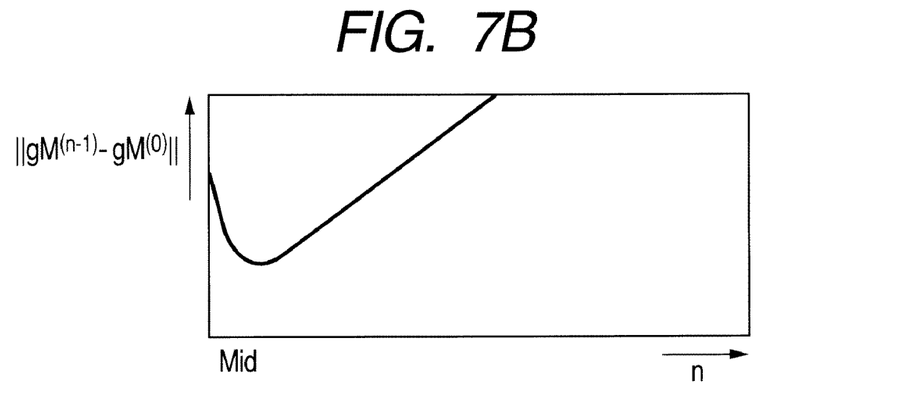
Figure 7C:
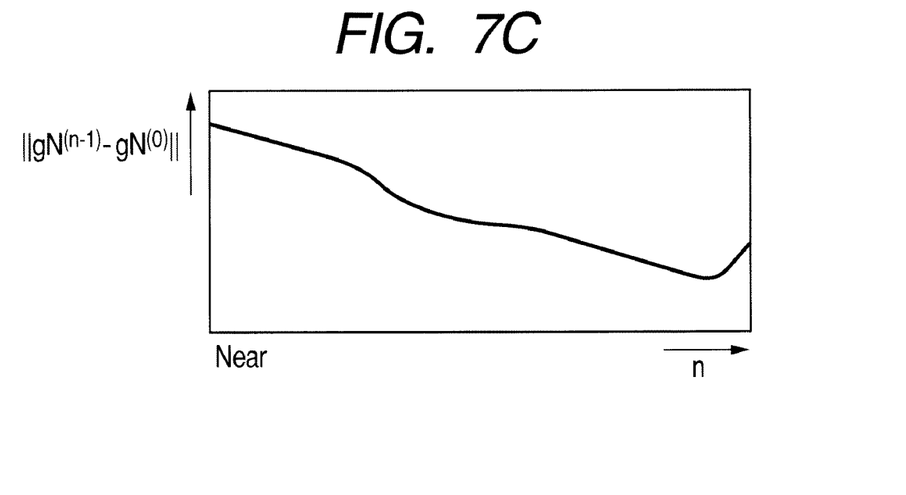

FIGS. 7A, 7B, and 7C illustrate norms at the time of the image reconstruction of every distance information (Far, Middle, Near). In all of the above cases, the number of minimum values of the convergence evaluation is equal to 1 and a plurality of minimum values showing the discrimination result are not generated.

5. Image Synthesis.

Subsequently, the black near view portion of the distance image illustrated in FIG. 3 is synthesized by using $fN^{(n)}$ held in S304, the middle distance portion is synthesized by using $fM^{(n)}$ held in S307, and the far view portion is synthesized by using $fF^{(n)}$ held in S310 (each n differs), respectively (S311). Consequently, the image f in which the deteriorated images have been reconstructed at all of the distances can be obtained.

Subsequently, the system controller 100 reads out the reconstruction image f from the memory 131 through the memory controller 130 and writes it into the flash memory 142 through the flash memory controller 141 (S311). In this manner, the image reconstructing process is finished. In a manner similar to the first embodiment, it is sufficient that the operator decides any one of the following modes by instructing it by using the cross-pad 98, or the like: the mode in which the image is compressed again by the codec 140; and the mode in which the previous blur image is overwritten and erased.

In the embodiment, since the distance layer is formed from the distance information and the convergence discrimination of the super resolution process is made for every distance layer, the number of minimum values of the convergence evaluation is equal to 1 and a plurality of minimum values showing the discrimination result are not generated. Consequently, the erroneous discrimination is never made and the precise image reconstructing process can be executed.

Although the example in which the resolution reconstructing processes of the objects belonging to the three distance layers has been shown in the embodiment, the invention is not limited to such an example but the processes may be executed every distance layers of the number which is smaller or larger than 3.

Third Embodiment

Figure 8:
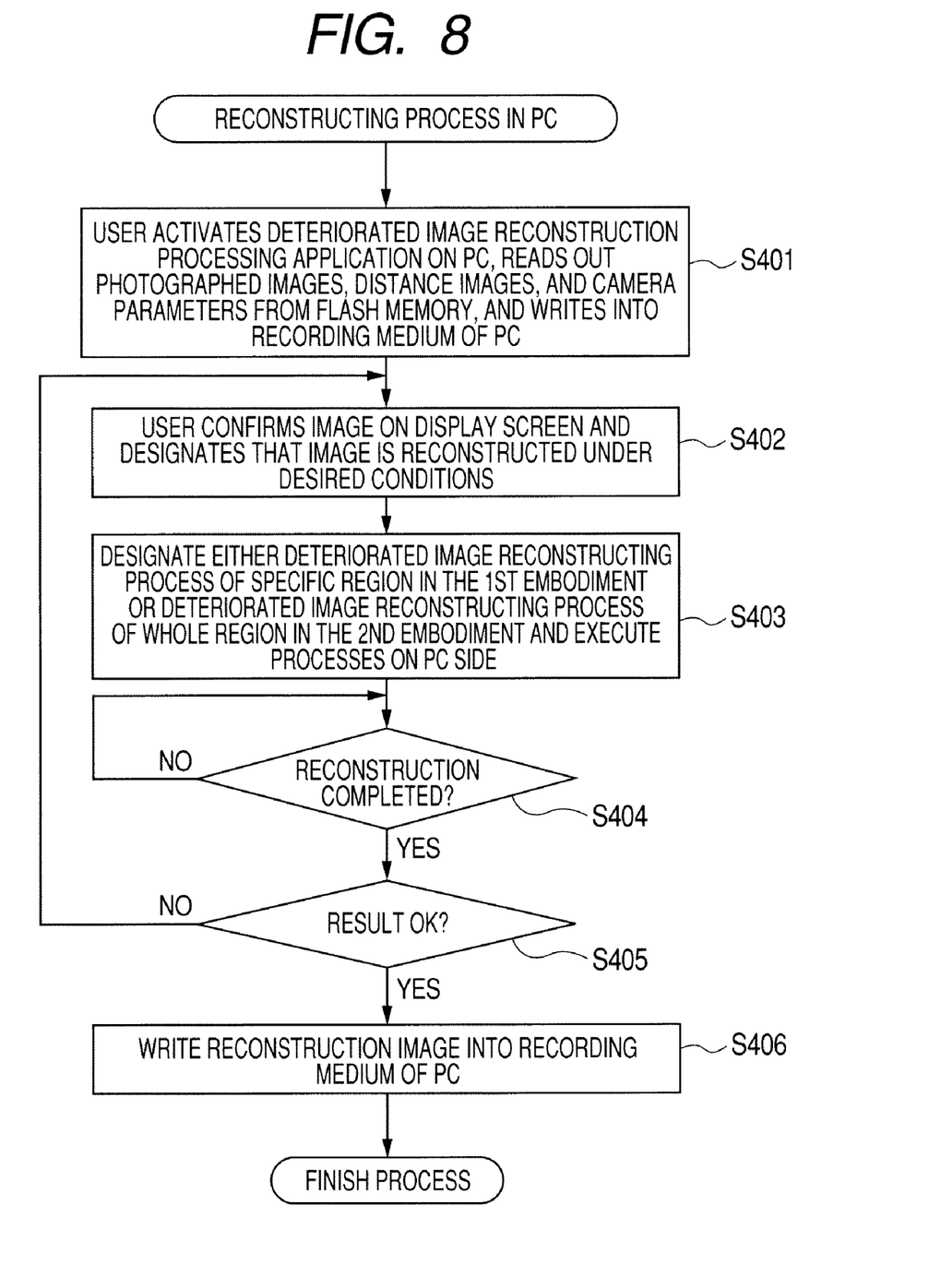
FIG. 8 is a flowchart illustrating processes in a PC in the third embodiment of the invention.

Subsequently, the third embodiment of the invention will be described. In the embodiment, an example in the case of reconstructing a deteriorated image on a PC side is shown. That is, an example in which an image photographed by the camera in FIG. 1 is sent to the PC and the deteriorated image is reconstructed on the PC side is shown. FIG. 8 is a flowchart illustrating processes in the embodiment. Since 1. the operation at the time of preparing for photographing, 2. the operation at the time of photographing, and 3. the operation to confirm the image after photographing are the processes on the camera side, they are similar to those in the first embodiment.

In FIG. 8, the user inserts the flash memory into the PC and activates a deteriorated image reconstruction processing application on the PC. Thus, the deteriorated image reconstruction processing application reads out the photographed images, distance images, and camera parameters from the flash memory, writes them into a recording medium of the PC, and displays each image (S401).

The user confirms the image on a display screen, inputs desired conditions showing either the deteriorated image reconstruction process of the specific region in the first embodiment or the deteriorated image reconstruction process of the whole region in the second embodiment, and designates the system for reconstructing the image (S402).

The deteriorated image reconstruction processing application executes the processes according to the designated system by the algorithm described in the first or second embodiment (S403). At this time, although the images have been reconstructed with respect to the three distance layers in the second embodiment, the invention is not limited to such an example.

When the image reconstruction is completed in S404, the PC presents the reconstruction image obtained after completion of the processes to the user. If the reconstruction image is OK, the user writes the image into the recording medium of the PC (S406). For example, although the deteriorated images in the whole region have been reconstructed, if the user determines that the reconstruction image is NG because he wants a blur taste on the background, he instructs again the deteriorated image reconstructing process of the specific region, changes the reconstructing conditions, and executes the deteriorated image reconstructing process. After the end of the processes, the user confirms the image and, thereafter, writes it into the recording medium of the PC.

Specifically speaking, if the user determines that the reconstruction image is NO in S405, the processing routine is returned to S402. The user designates that the image is reconstructed under the desired conditions as mentioned above, and changes the reconstructing conditions of the image. At this time, for example, if the user wants the blur taste on the background, it is sufficient to designate conditions in such a manner that the background portion is held as a deteriorated image and the image reconstructing process is executed to other images such as human objects and the like.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present application claims priority from Japanese Patent Application JP2008-226976 filed on Sep. 4, 2008, the content of which is hereby incorporated by reference into this application.

What is claimed is:

1. An image processing apparatus for reconstructing a deteriorated image including an image of an object, the image processing apparatus comprising:
a measuring unit that measures a distance to the object, thereby setting a distance layer to which the object belongs;
an image reconstructing unit that reconstructs the deteriorated image in regions by repetitive calculations, each region corresponding to a different distance layer;

an end discriminating unit that discriminates, for each region, an end of the repetitive calculations by the image reconstructing unit, wherein the end discriminating unit makes the end discrimination only to a specific distance layer among the distance layers or to each of the distance layers, and wherein the image reconstructing unit synthesizes the reconstruction image of each of the distance layers in the case of making the end discrimination to each of the distance layers;

a designating unit that designates reconstructing conditions of the image; and a presenting unit that presents the reconstructed reconstruction image, wherein in the case of changing the presented reconstruction image, the reconstructing conditions of the image are designated again by the designating unit and the deteriorated image is reconstructed.

2. The image processing apparatus according to claim 1, wherein when the reconstructing conditions of the image are designated by the designating unit and the deteriorated image is reconstructed again, if an image to be held as a deteriorated image exists among the reconstruction images, the image is held as a deteriorated image and the images of the other distance layers are reconstruction processed.

3. The image processing apparatus according to claim 1, wherein when the reconstructing conditions of the image are designated by the designating unit and the deteriorated image is reconstructed again, if an image to be held as a deteriorated image exists among the reconstruction images, the image is held as a deteriorated image and the images of the other distance layers are reconstruction processed.

4. An image processing method of reconstructing a deteriorated image including an image of an object, the image processing method comprising:

measuring a distance to the object, thereby setting a distance layer to which the object belongs;

reconstructing the deteriorated image in regions by repetitive calculations, each region corresponding to a different distance layer;

discriminating, for each region, an end of the repetitive calculations in the reconstructing, wherein the discriminating comprises making the end discrimination only to a specific distance layer among the distance layers or to each of the distance layers, wherein the reconstructing step synthesizes the reconstruction image of each of the distance layers in the case of making the end discrimination to each of the distance layers;

designating reconstructing conditions of the image; and presenting the reconstructed reconstruction image, wherein in the case of changing the presented reconstruction image, the reconstructing conditions of the image are designated again and the deteriorated image is reconstructed.

5. A non-transitory computer-readable storage medium for storing a computer program that causes a computer to execute the image processing method according to claim 4.

6. A non-transitory apparatus readable storage medium for storing a computer program that causes a computer to execute the image processing method according to claim 4.

7. The image processing apparatus according to claim 1, wherein the end discriminating unit makes the end discrimination only to a specific distance layer among the distance layers.

8. The image processing apparatus according to claim 1, wherein the end discriminating unit makes the end discrimination to each of the distance layers.

9. The image processing apparatus according to claim 1, wherein the image reconstructing unit reconstructs the deteriorated image in regions by repetitive calculations by using a point spread function.

10. An image processing apparatus for reconstructing a deteriorated image including an image of an object, the image processing apparatus comprising:

a measuring unit that measures a distance to the object, thereby setting a distance layer to which the object belongs;

an image reconstructing unit that reconstructs the deteriorated image in regions by repetitive calculations, each region corresponding to a different distance layer, wherein the repetitive calculations are conducted region by region, and wherein the image reconstructing unit synthesizes the reconstruction image of each of the distance layers when the repetitive calculations are completed;

a designating unit that designates reconstructing conditions of the image; and a presenting unit that presents the reconstructed reconstruction image, wherein in the case of changing the presented reconstruction image, the reconstructing conditions of the image are designated again by the designating unit and the deteriorated image is reconstructed.

11. The image processing apparatus according to claim 10, wherein a number of the repetitive calculation for a first region corresponding to a first distance layer is different from a number of the repetitive calculation for a second region corresponding to a second distance layer that is different from the first layer.

12. The image processing apparatus according to claim 10, wherein the image reconstructing unit reconstructs the deteriorated image in regions by repetitive calculations by using a point spread function.

13. An image processing method for reconstructing a deteriorated image including an image of an object, the image processing method comprising:

measuring a distance to the object, thereby setting a distance layer to which the object belongs; and reconstructing the deteriorated image in regions by repetitive calculations, each region corresponding to a different distance layer, wherein the repetitive calculations are conducted region by region, and wherein the reconstructing step synthesizes the reconstruction image of each of the distance layers when the repetitive calculations are completed;

designating reconstructing conditions of the image; and presenting the reconstructed reconstruction image, wherein in the case of changing the presented reconstruction image, the reconstructing conditions of the image are designated again and the deteriorated image is reconstructed.

14. The image processing method according to claim 13, wherein a number of the repetitive calculation for a first region corresponding to a first distance layer is different from a number of the repetitive calculation for a second region corresponding to a second distance layer that is different from the first layer.

15. The image processing method according to claim 13, wherein the deteriorated image is reconstructed in regions by repetitive calculations by using a point spread function.

* * * * *